E. V. HARTFORD.
SHOCK ABSORBER.
APPLICATION FILED DEC. 10, 1910.
1,081,962.  Patented Dec. 23, 1913.
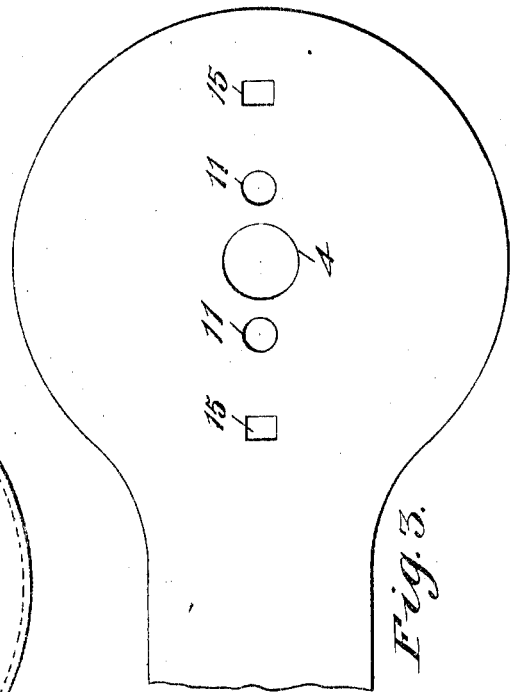
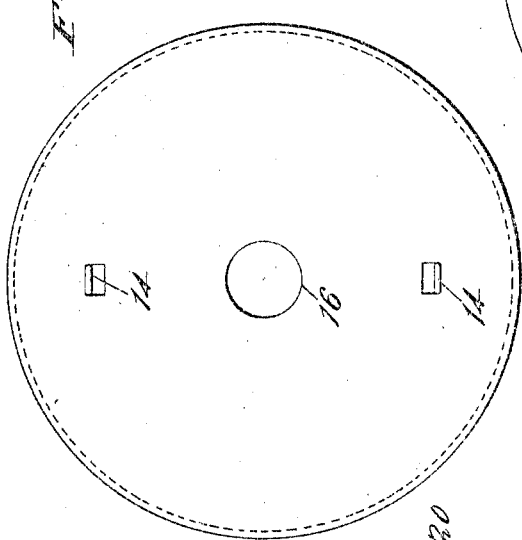
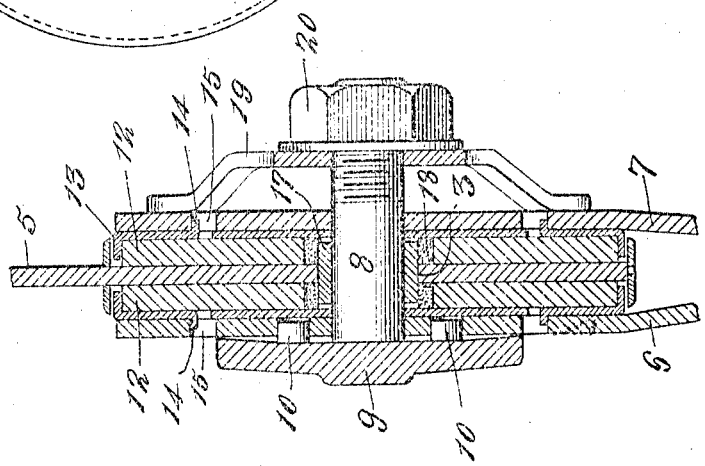

UNITED STATES PATENT OFFICE.

EDWARD V. HARTFORD, OF DEAL, NEW JERSEY.

SHOCK-ABSORBER.

1,081,962.

Specification of Letters Patent.

Patented Dec. 23, 1913.

Application filed December 10, 1910. Serial No. 596,670.

*To all whom it may concern:*

Be it known that I, EDWARD V. HART-FORD, a citizen of the United States, residing at Deal, in the county of Monmouth and State of New Jersey, have invented certain new and useful Improvements in Shock-Absorbers, of which the following is a full, clear, and exact specification.

This invention relates to and has for an object to provide an improved shock absorber.

The invention has reference to improved means for preventing independent rotation of certain parts of the device relatively to other parts and for preventing frictional wearing between some of the movable parts.

The invention presents a strong and mechanical structure.

In the drawings accompanying and forming a part of this specification so much of a shock absorber embodying one practicable form of my invention is shown as will be necessary to illustrate the present invention.

Figure 1 is a central section through a portion of a shock absorber equipped with one form of my present improvement. Fig. 2 is an illustration of one of the friction disk cups disassembled, and Fig. 3 is an illustration of an end of one of the arms the other end of which will in practice be secured to one of the movable parts of the vehicle.

The arm 5 is illustrated broken away, the portion which is not shown will be secured to a portion of the vehicle in a manner well known in this art. The pivot end of this arm is shown interposed between the pivot ends of the members of a pair of arms 6 and 7, which are also shown broken away, the portions which are not shown will in the usual manner be secured together and to another part of the vehicle which is movable relatively to the part to which the arm 5 is secured and between which vehicle parts it is desired to interpose resistance upon such relative movement. A pivot pin 8 is illustrated for affording the pivotal connection between the interposed arm 5 and the members of the pair of arms 6, 7. This pivot pin is provided with a head 9 having pins 10, which pins engage suitable openings 11 in the arm 6. The openings 4 in the arms 6, 7 through which the pivot pin passes will preferably be constructed to closely engage the pivot pin, since the pin is held from rotation relatively to these arms.

Suitable wear resisting devices shown in the form of disk shaped washers 12 will be interposed between the side faces of the arm 5, where this lies between the arms 6 and 7. Each of these wear resisting members 12 is incased in a washer cup 13, on its side toward the adjacent arm 6 or 7, as the case may be. It is desirable to prevent independent rotation of the washer cup 13 relatively to the adjacent arm 6 or 7 and for this purpose the washer cups are provided with struck up lugs 14, which find entrance in suitably prepared openings 15, in the ends of the arms. The openings 16 in the washer cups for receiving the pivot pin may closely conform to this pin, because, being held from rotation relatively to the arms of the pair of arms they will also be held from independent rotation relative to the pivot pin 8.

The lugs 14 are located at a considerable distance from the center of the cup and are comparatively near the perimeter thereof. This location of the lugs places them at positions in which there will be the greatest leverage and consequently the least wear.

The arm 5 oscillating on the pivot 8 as the connected parts of the vehicle move one relatively to the other has a wearing effect upon the opening or eye in the arm 5 which surrounds the pivot pin and also upon the pin itself. This wearing shortens the life of the device and occasions unsatisfactory working after the device has been in use for a short time. To obviate this difficulty the eye 3 in the interposed arm 5 is shown of larger radius than the radius of the pivot pin. A hardened anti-friction sleeve or free-bearing member 17, which is of much greater length than the thickness of the arm 5, is shown mounted loose upon the pivot pin 8, and the eye of the interposed arm 5 mounted loose upon this sleeve 17, whereby a working fit will be present between the pin and the sleeve and between the sleeve and the eye in the arm. By this construction, upon the relative movement of vehicle members, either the sleeve may move on the pin or may move in the eye, according to which at any particular moment may present the least frictional resistance.

The anti-friction sleeve 17 may be sufficiently long to pass through openings in the wear resisting disks 12, and extend approximately to the inner faces of the washer cups 13. The central openings in the disks 12 may be made of considerably greater radius than the outside radius of the sleeve 17 and lubricant carrying packing 18, may be mounted within the chamber thus provided between the disks and the sleeve.

The parts may be held together yieldably in some well known manner as by means of the spring washer 19 and nut 20.

Having described my invention I claim:

1. In a shock absorber for vehicles having spring-supporting means, the same comprising a plurality of arms, friction material interposed therebetween, retaining cups for said friction material, means for holding the arms, cups, and material in close association to insure a constant drag between the parts when rotary movement is imparted to the arms, and means for preventing independent movement of the retaining cups and two of said arms, said means comprising lugs struck up from the cups and projected into openings provided in two of said arms for the purpose specified.

2. In a shock absorber for vehicles having spring-supporting means, the same comprising a plurality of arms, friction material interposed therebetween, retaining cups for said friction material, a bolt for holding said arms, cups, and material in close association to insure reluctant movement between them, an anti-friction sleeve mounted upon the bolt, positioned and retained within and between the cups, and means comprising lugs struck up from the cups and projecting into suitable openings provided in two of said arms for preventing independent movement thereof.

3. In a shock absorber for vehicles having spring-supporting means, the same comprising a plurality of friction disks, friction material interposed therebetween, retaining cups for said friction material, supporting arms for said friction disks, means for holding the friction disks, cups, and material in close association, means for preventing independent movement of said friction disks and retaining cups, an anti-friction bearing for one of said friction disks, said bearing being positioned and retained within and between the cups, and lubricant-carrying packing surrounding the anti-friction bearing.

4. In a shock-absorber for vehicles having spring-supporting means, the combination with a pivot pin, of a pair of arms held from movement relatively thereto, a thin arm interposed between the members of said pair of arms and having an eye surrounding said pivot pin, an anti-friction sleeve longer than the thickness of such arm mounted upon said pivot pin and occupying the eye in the said arm and having a working fit with the said pin and with said eye, friction disks between said interposed arm and the arms of the pair and having openings surrounding said sleeve of greater radius than the outside radius thereof, such openings forming a chamber, and lubricant carrying packing disposed in such chamber between the said friction disks and sleeve, and means for holding the arms and friction disks in close association so that any movement thereof will be accompanied by a corresponding drag.

In witness whereof I have hereunto set my name in the presence of two subscribing witnesses.

EDWARD V. HARTFORD.

Witnesses:
LOUIS J. MASTRANGEL,
JNO. Y. DARTFOU.